US008340261B2

(12) United States Patent
Croak et al.

(10) Patent No.: US 8,340,261 B2
(45) Date of Patent: *Dec. 25, 2012

(54) METHOD AND APPARATUS FOR UBIQUITOUS ACCESS TO DIALING PLANS FOR ENTERPRISE NETWORKS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1211 days.

This patent is subject to a terminal disclaimer.

(21) Appl. No.: 10/951,137

(22) Filed: Sep. 27, 2004

(65) Prior Publication Data

US 2006/0072557 A1   Apr. 6, 2006

(51) Int. Cl.
*H04M 3/42* (2006.01)
(52) U.S. Cl. .............................. 379/201.01; 379/220.01
(58) Field of Classification Search .................. 379/220, 379/219, 221, 114
See application file for complete search history.

(56) References Cited

U.S. PATENT DOCUMENTS

| 6,011,795 | A | * | 1/2000 | Varghese et al. | 370/392 |
| 6,246,757 | B1 | * | 6/2001 | Cai et al. | 379/114.2 |
| 6,275,574 | B1 | * | 8/2001 | Oran | 379/201.01 |
| 7,289,522 | B2 | * | 10/2007 | Gallant | 370/401 |
| 2005/0078611 | A1 | * | 4/2005 | Adams et al. | 370/254 |

FOREIGN PATENT DOCUMENTS

WO    WO 97/48242 A    12/1997

OTHER PUBLICATIONS

Licciardi (An architecture for In-internet Hybrid Services, vol. 35, Issue 5, Apr. 2001, pp. 537-549).*
International Search Report, Dated Mar. 24, 2006, 3 pages.

* cited by examiner

*Primary Examiner* — Curtis Kuntz
*Assistant Examiner* — Amal Zenati

(57) ABSTRACT

The invention comprises a method and apparatus for providing at least one network endpoint of an enterprise customer network access to at least one dialing plan. Specifically, the method comprises receiving at least one dialing plan request from the at least one network endpoint, retrieving at least one address mapping in response to the at least one dialing plan request, and responding to the at least one dialing plan request using the at least one address mapping.

21 Claims, 4 Drawing Sheets ions that are common to the figures.

METHOD AND APPARATUS FOR UBIQUITOUS ACCESS TO DIALING PLANS FOR ENTERPRISE NETWORKS

FIELD OF THE INVENTION

The invention relates to the field of communications networks, and more specifically, to a method for accessing dialing plans for enterprise networks.

BACKGROUND OF THE INVENTION

An enterprise network is a large customer network including a vast array of networking equipment (often geographically dispersed) requiring the ability to communicate and share information. An enterprise customer (such as Intel, IBM, and the like) typically subscribes to specific service plans such that each time a user comes online in the enterprise network, the user is provisioned to have access to services in the service plans to which the enterprise customer subscribes. The services provided in the service plans may include four-digit dialing, five-digit dialing, star-nine dialing (i.e. dialing "*9" for international), call waiting, call forwarding, teleconferencing capabilities, voicemail, and a wide variety of other services and dialing plans offered by most service providers.

Since enterprise customers typically have different telecommunication services and application needs, the services and dialing plans subscribed to by an enterprise customer are typically particular to that enterprise customer, and tend to vary across enterprise customers. However, although enterprise customers use various combinations of dialing plans, many of the dialing plans used across enterprise customers tend to be the same. As such, a service provider supporting a plurality of enterprise customers typically hosts a large embedded base of public and private dialing plans.

A service provider typically packages particular services, dialing plans, and other features into service offerings that span a wide variety of services that may be required by an enterprise customer (such as time division multiplexing (TDM) services, Internet Protocol (IP) services, international services, and the like). As such, specific dialing plans are often embedded within a particular service offering in order to enable the enterprise customer users to use the services provided in the particular service offering. In general, a dialing plan provides specialized routing associated with specialized services to which an enterprise customer subscribes.

Unfortunately, the embedding of specific dialing plans within service offerings requires that an enterprise customer subscribe to a full service offering in order to obtain one particular dialing plan. For example, if a US-based enterprise customer requires a four-digit dialing plan, but the service provider has included the four-digit dialing plan within an international service offering, the US-based enterprise customer must subscribe to the entire international service offering in order to utilize the four-digit-dialing dialing plan. As a result, network endpoints are often unable to utilize particular dialing plans.

As such, a need exists in the art for a method for providing ubiquitous access to dialing plans for any network endpoint in an enterprise customer network.

SUMMARY OF THE INVENTION

In one embodiment, the invention comprises a method and apparatus for providing at least one network endpoint of an enterprise customer network access to at least one dialing plan. Specifically, the method comprises receiving at least one dialing plan request from the at least one network endpoint, retrieving at least one address mapping in response to the at least one dialing plan request, and responding to the at least one dialing plan request using the at least one address mapping.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a service provider network supporting an enterprise customer network; however, the methodology of the invention can readily be applied to other network topologies. In general, the present invention enables enterprise customer network endpoints to access at least one of a plurality of available dialing plans. In other words, instead of having a dialing plan tightly embedded within a particular service, a repository of dialing plans is established such that at the time an enterprise customer user accesses a service, that service accesses the dialing plan required to provide that service from the repository of dialing plans. As such, the present invention enables any user on an enterprise customer network to access any dialing plan, regardless of the access technology by which the user gains access to the network.

Figure 1:
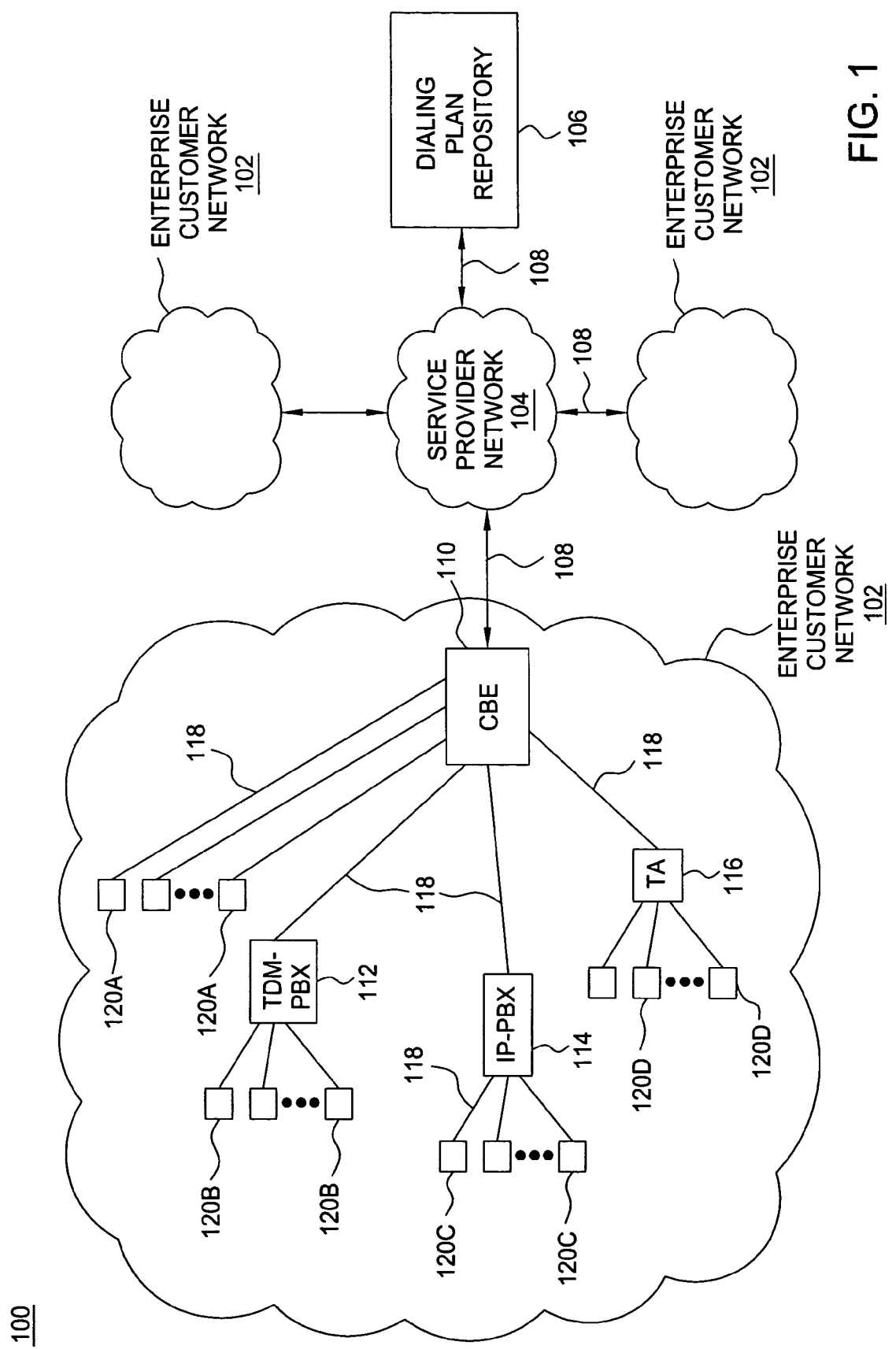
FIG. 1 depicts a communication architecture including a plurality of network endpoints within an enterprise customer network.

FIG. 1 depicts a communication architecture including a plurality of network endpoints within an enterprise customer network. Specifically, the communication architecture 100 of FIG. 1 comprises an enterprise customer network 102, a service provider network 104, and a dialing plan repository 106. The enterprise customer network 102 and the dialing plan repository 106 communicate with the service provider network 104 via communication links 108. Although only four communication links 108 are depicted, additional communication links may be used to facilitate communication with the service provider network 104.

The enterprise customer network 102 comprises a customer border element (CBE) 110 and a plurality of network endpoints 120A-D (collectively, network endpoints 120) connected via communication links 118. A customer border element is a network element (such as a router, switch, and the like) through which network endpoints in enterprise customer network endpoints typically connect to a communication service provider's backbone network (illustratively, service provider network 104). A customer border element typically performs functions such as routing, switching, admission control, and the like. Although not depicted or described in detail, the other portions of enterprise customer network 102 depicted in FIG. 1 comprise numerous network endpoints, as well as associated border elements and communication links for facilitating communication with other network endpoints in enterprise customer network 102.

Although not depicted, those skilled in the art will appreciate that service provider network 104 comprises numerous network gateway and peer network border elements, core equipment, and associated communication links for carrying information across the service provider network 104. Furthermore, although not depicted, the service provider network 104 may include call control elements, media servers, common network control functions such as network routing engines, user profile engines, service brokers, call admission control, and the like.

A network endpoint is typically a user terminal (such as a phone, computer, and the like) by which one or more users communicate with other users of an enterprise customer network. The network endpoints 120 communicate with the customer border element 110 via communication links 118. Since each of the network endpoints 120 is provisioned as part of the enterprise customer network 102, each of the network endpoints 120 is able to send and receive information from every other network endpoint 120. Since each of the network endpoints 120 belongs to enterprise customer network 102, and may therefore be geographically dispersed, each of the network endpoints 120 may communicate with the service provider network 104 via the customer border element 110.

A network endpoint (such as a TDM phone, an Integrated Services Digital Network (ISDN) phone, an IP phone, a computer and the like) typically establishes a connection with a service provider network via a customer border element and a service provider border element (not depicted). In general, large enterprise customer locations are provided dedicated access to the service provider network using leased lines, frame relay (FR), asynchronous transfer mode (ATM), and like access technologies. The enterprise customer network endpoints in small branch offices and remote locations are typically provided access to the service provider network using shared access technologies such as independent local exchange carrier (ILEC) service, digital subscriber line (DSL) service, cable modem service, and the like.

In one embodiment, a network endpoint connects to a service provider network through a circuit-switched connection with a provider border element, as known in the art. In another embodiment, a network endpoint connects to a service provider network through an Internet Protocol connection with a provider border element, as known in the art. Although only two methods of connecting to a service provider network are discussed, those skilled in the art will appreciate that numerous other techniques for establishing a connection between a network endpoint and a service provider network exist in the art.

The TDM access from a network endpoint to a service provider network may be implemented via edge signaling, direct access, and the like. In one embodiment, a network endpoint (such as a TDM phone) connects to a border element via a TDM Private Branch Exchange (PBX). For example, as depicted with respect to the enterprise customer network 102, the network endpoints 120B are connected to customer border element 110 via TDM-PBX 112 and associated communication links 118.

The IP access from a network endpoint to a service provider network may be implemented via a customer managed router, a Terminal Adapter (TA), and like IP access technologies. In one embodiment, a network endpoint (such as an IP phone) connects to a border element via an Internet Protocol Private Branch Exchange (IP-PBX). For example, as depicted with regard to enterprise customer network 102, the network endpoints 120C are connected to customer border element 110 via IP-PBX 114 and associated communication links 118.

In another embodiment, a network endpoint (such as an ISDN phone) connects to a border element via a Terminal Adapter (TA), a Media Terminal Adapter (MTA), and like access equipment and technologies. For example, as depicted with respect to enterprise customer network 102, the network endpoints 120D are connected to customer border element 110 via TA 116 and associated communication links 118. In another embodiment, a network endpoint (such as a computer terminal) connects to a border element directly (without traversing an associated TDM-PBX, IP-PBX, or TA). For example, as depicted with respect to enterprise customer network 102, the network endpoints 120A are connected to customer border element 110 directly via one of associated communication links 118. Although not depicted as traversing a TDM-PBX, IP-PBX, or TA, directly connected network endpoints may traverse other equipment for communicating with a service provider border element, such as a customer managed router, a cable modem, a Digital Subscriber Line Access Multiplexer (DSLAM), and the like.

Although three network endpoints are depicted in each grouping of network endpoints, fewer or more network endpoints may be connected to a customer border element through a TDM-PBX, an IP-PBX, or a TA, or directly connected to a customer border element. Although only one customer border element is depicted, additional customer border elements may be deployed within an enterprise customer network. Similarly, although only one TDM-PBX, IP-PBX, and TA are depicted, fewer or more may be deployed depending upon the types of network endpoints deployed within the enterprise customer network (such as TDM phones, IP phones, and the like).

In order to facilitate communication between network endpoints of an enterprise customer network, the enterprise customer typically subscribes to service plans offered by the service provider. A service plan is a suite of services and features available to each of the network endpoints in the enterprise customer network. Such services include dialing plans, call waiting, call forwarding, teleconferencing, voicemail, and the like. Unfortunately, as described above, dialing plans are typically tightly tied to particular service packages, such that in order for a network endpoint to utilize a particular dialing plan, the enterprise customer must subscribe to the entire service package associated with that particular dialing plan.

Using the methodologies of the present invention, a network endpoint is able to access and use any dialing plan available from the service provider. As depicted in FIG. 1, dialing plans are accessed from dialing plan repository 106. Thus, the present invention obviates the need to maintain a tight link between specific dialing plans and associated service packages, enabling any network endpoint in an enterprise customer network to access any dialing plan at any time, regardless of the service plans to which that enterprise customer subscribes. As such, in one embodiment, the step of responding to at least one dialing plan request using at least one address mapping is independent of any service plan associated with the at least one dialing plan.

In one embodiment, as depicted in FIG. 1, the dialing plan repository is implemented as a stand-alone system (illustratively, dialing plan repository 106) in communication with service provider network 104. As depicted in FIG. 1, the dialing plan repository 106 communicates with the service provider network 104 via at least one communication link 108. As such, in this arrangement, each of the network endpoints 120 may communicate with the dialing plan repository 106 via the customer border element 110 and service provider network 104.

In another embodiment (not depicted), dialing plan repository 106 is implemented as a stand-alone system within the service provider network 104. In another embodiment (not depicted) dialing plan repository 106 is located in a centralized, shared resource such as a management system, a provider core element, a provider border element, a media gateway, a voice gateway, and like network systems and elements hosted within service provider network 104. In each of these embodiments, the dialing plan repository 106 includes information storage and processing, translation, and networking resources required to access and utilize a dialing plan, as known in the art.

Figure 2:
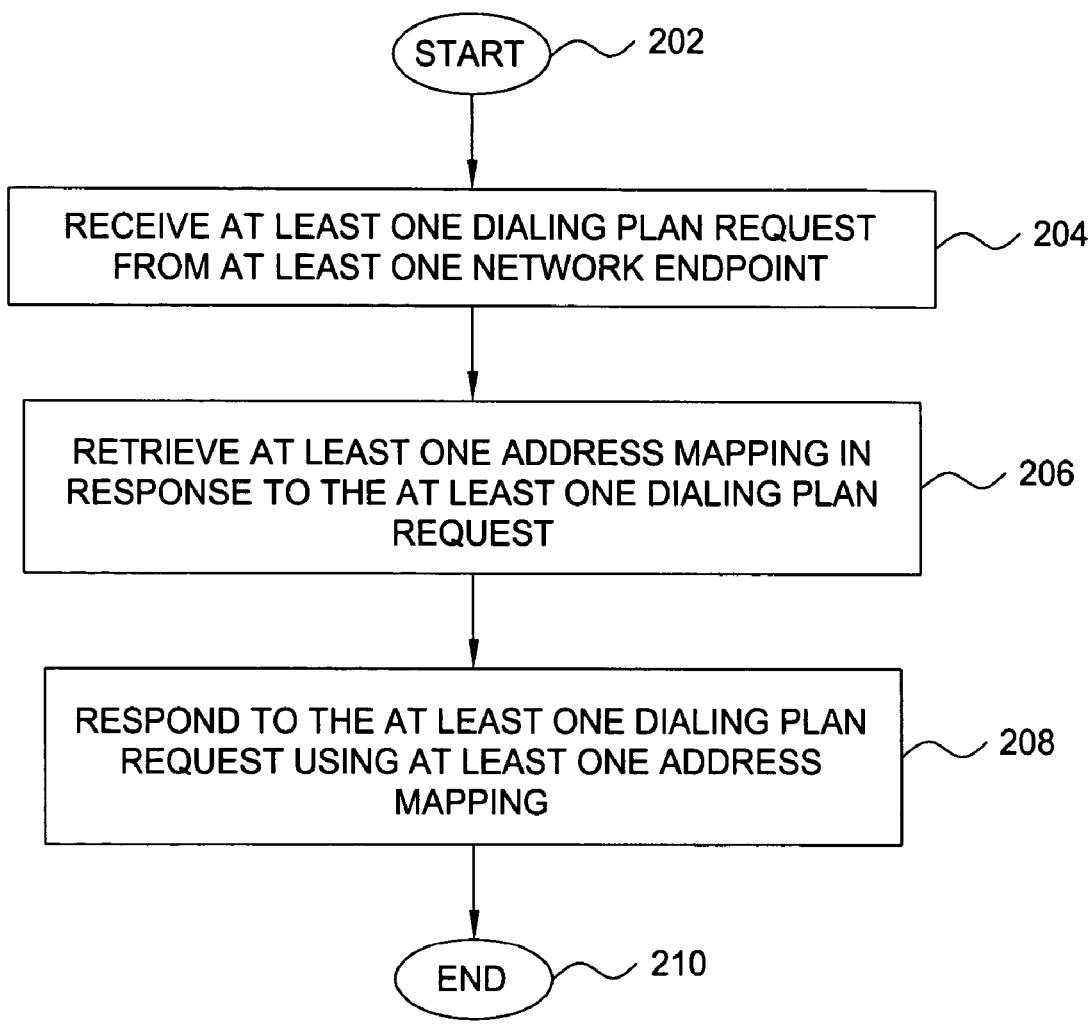
FIG. 2 depicts a flow diagram of a method according to one embodiment of the invention.

FIG. 2 depicts a flow diagram of a method according to one embodiment of the invention. Specifically, method 200 of FIG. 2 comprises a method for providing at least one network endpoint of an enterprise customer network access to at least one dialing plan. The method 200 is entered at step 202 and proceeds to step 204. At step 204, at least one dialing plan request is received from at least one network endpoint. At step 206, at least one address mapping is retrieved in response to the at least one dialing plan request. At step 208, the at least one dialing plan request is responded to using the at least one address mapping. The method 200 then proceeds to step 210 where the method 200 ends.

Figure 3:
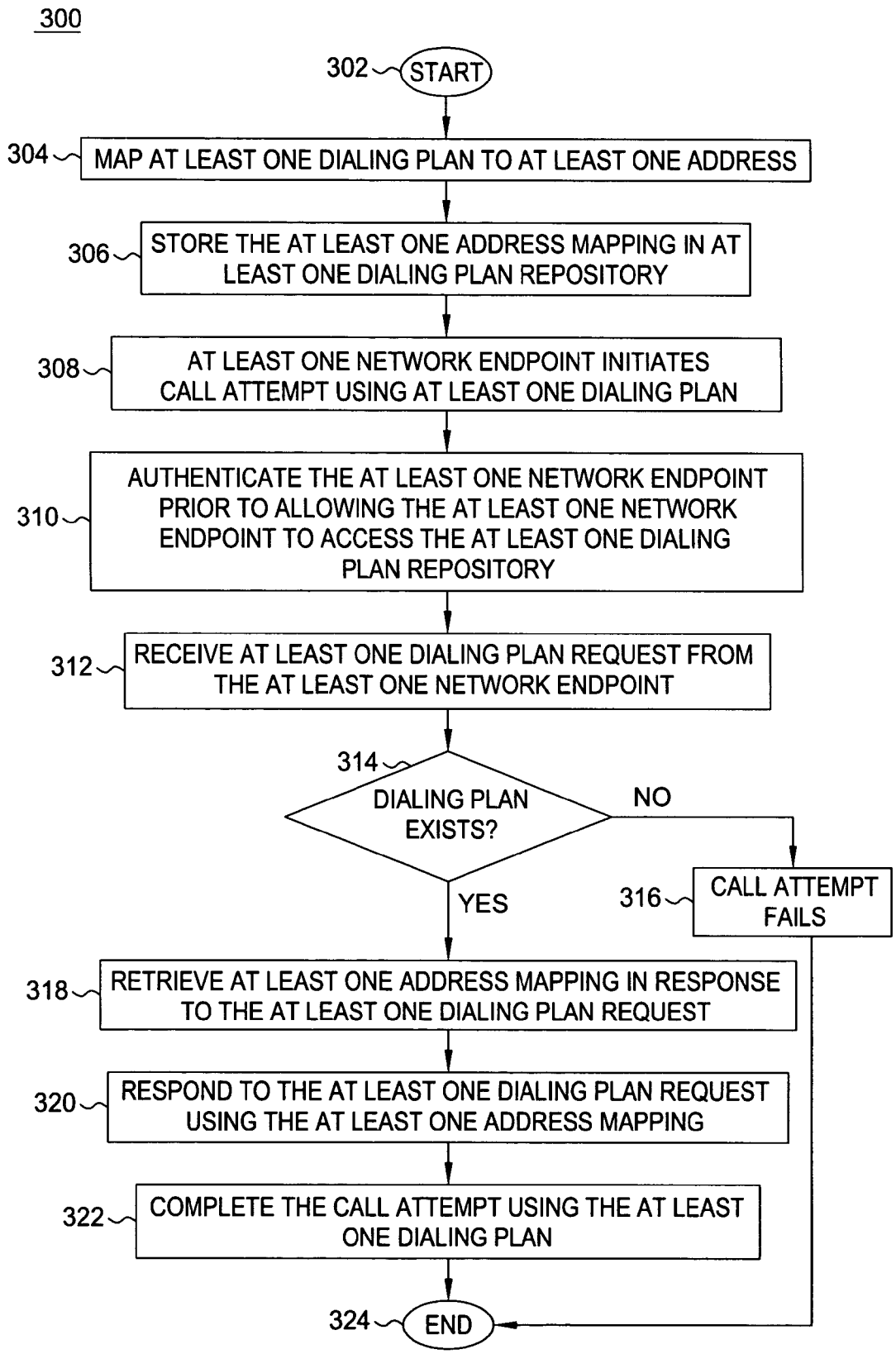
FIG. 3 depicts a detailed flow diagram of the method depicted in FIG. 2.

FIG. 3 depicts a detailed flow diagram of the method depicted in FIG. 2. As such, a single step as depicted in FIG. 2 may correspond to multiple steps as depicted in FIG. 3. Specifically, method 300 of FIG. 3 comprises a method of providing at least one network endpoint of an enterprise customer network access to at least one dialing plan. The method 300 is entered at step 302 and proceeds to step 304.

At step 304, at least one dialing plan is mapped to at least one address, resulting in at least one address mapping. The at least one dialing plan comprises at least one of a reduced number dialing plan and an international dialing plan. As such, the at least one dialing plan comprises at least one of three-digit extension dialing, four-digit extension dialing, five-digit extension dialing, star-nine dialing (i.e., dial "*9 for an non-enterprise customer or an international endpoint), and the like. In one embodiment, the at least one address is an Internet Protocol (IP) address.

At step 306, the at least one address mapping is stored in at least one dialing plan repository. In one embodiment, the dialing plan repository is located on a management system (or other remote database) in communication with the service provider network. In another embodiment, the dialing plan repository is located on a system within the service provider network (such as a provider border element, media gateway, voice gateway, provider core element, and the like). The at least one dialing plan mapping is stored in a memory, database, or any other component suitable for storing at least one address mapping, as known in the art.

At step 308, at least one network endpoint in an enterprise customer network initiates a call attempt to at least one other network endpoint in the enterprise customer network. The at least one call attempt is initiated using at least one dialing plan. For example, with respect to FIG. 1, assume that one of the network endpoints 120B (with a phone number of 803-555-4321) initiates a call to one of the network endpoints 120D (with a phone number of 732-555-6789) by dialing the four-digit extension (6789) of the telephone number. In this example, the network endpoint initiates a call attempt using four-digit extension dialing.

At step 310, the at least one network endpoint initiating the call (one of the network endpoints 120B) attempt is authenticated prior to allowing that network endpoint to access the dialing plan repository. The authentication of the at least one network endpoint that is initiating the call is performed in order to verify that the user of that network endpoint is provisioned to access the dialing plans in the dialing plan repository. Thus, the network endpoint initiating the call is authenticated to verify that that network endpoint is allowed to access dialing plan repository 106 via the service provider network 104.

At step 312, the at least one dialing plan request is received from the at least one network endpoint that initiated the call attempt. The at least one dialing plan request is received by a system on which the dialing plan repository is implemented. In continuation of the example above, the dialing plan request (via a call attempt) initiated by one of the network endpoints 120B is received by the dialing plan repository 106 via the service provider network 104.

At step 314, the system that received the at least one dialing plan request (dialing plan repository 106 in the example above) determines whether the requested dialing plan that the network endpoint attempted to use exists. If the dialing plan does not exist, the method 300 proceeds to step 316 (at which point the call attempt fails), and the method then proceeds to step 324 where the method 300 ends. For example, if four-digit dialing is not a valid dialing plan (does not exist in the dialing plan repository 106), dialing the four digit extension (6789) does not provide sufficient information to complete the call attempt. If the dialing plan does exist, the method 300 proceeds to step 318.

At step 318, at least one address mapping is retrieved (from memory, a database, or any other suitable component in which the at least one address mapping is stored, as known in the art) from the dialing plan repository in response to the at least one dialing plan request. The at least one address mapping is then used in order to respond to the dialing plan request. At step 320, the at least one dialing plan request is responded to using the at least one address mapping retrieved from the dialing plan repository. In other words, the at least one address mapping is used to complete the call attempt using the particular dialing plan requested by the network endpoint initiating the call.

At step 322, the call attempt is completed using the requested dialing plan. The call attempt is completed by signaling the network endpoint that the network endpoint that initiated the call attempt is trying to reach. For example, in continuation of the example above, the call attempt from one of the network endpoints 120B to one of the network endpoints 120D is completed using the four-digit dialing. In other words, by dialing the four digit extension (6789), the second network endpoint receives an indication that there is an incoming call (e.g., rings the phone). Thus, since the network endpoint is authenticated, and the dialing plan used by that network endpoint in order to initiate the call attempt is valid, the call attempt is completed using that request dialing plan. The method 300 then proceeds to step 324 where the method 300 ends.

Although depicted and described with respect to FIG. 3 as being performed serially, those skilled in the art will appreciate that at least a portion of the dialing plan request and address mapping steps of the method 300 may be performed contemporaneously. Similarly, although the dialing plan request and address mapping steps described above may be used to practice the invention, it should be noted that at least one embodiment of the present invention may be practiced using a subset of the steps described above.

Figure 4:
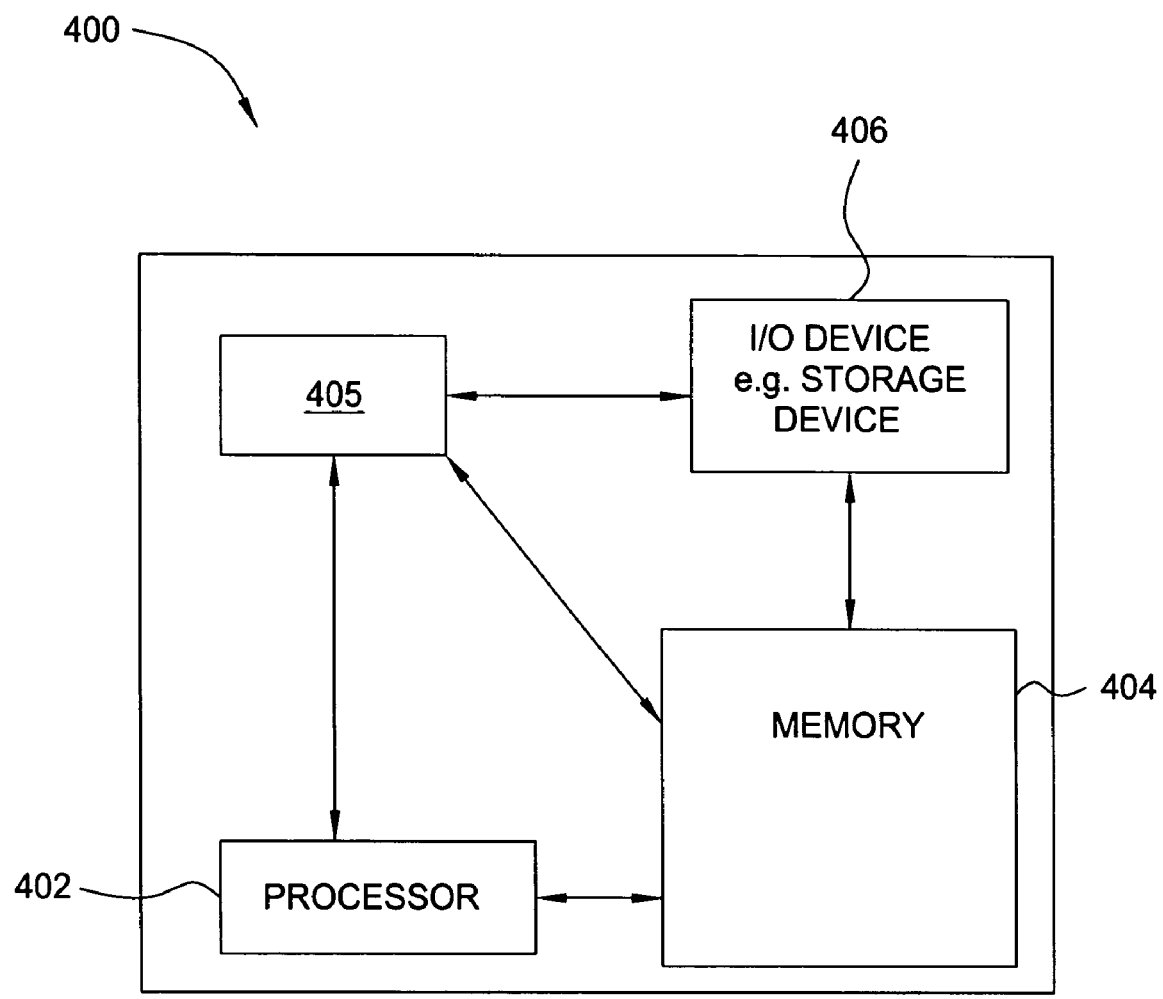
FIG. 4 depicts a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a dialing plan repository module 405, and various inpuVoutput devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present dialing plan repository module or process 405 can be loaded into memory 404 and executed by processor 402 to implement the functions as discussed above. As such, the present dialing plan repository process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for providing a network endpoint of an enterprise customer network access to a dialing plan, comprising:
   receiving a dialing plan request from the network endpoint;
   retrieving an address mapping in response to the dialing plan request, wherein the address mapping maps the dialing plan request to a dialing plan found in one of a plurality of service plans offered by a service provider, wherein the enterprise customer is a customer of the service provider and subscribed to a service plan of the plurality of service plans, wherein the dialing plan is a reduced number dialing plan that allows the enterprise customer to dial fewer than all digits of a telephone number, wherein the enterprise customer is not a subscriber to the dialing plan; and
   responding to the dialing plan request using the address mapping, wherein the responding to the dialing plan request comprises completing a call attempt using the dialing plan.

2. The method of claim 1, wherein the address mapping is retrieved from a dialing plan repository.

3. The method of claim 1, wherein the address mapping is formed by mapping the dialing plan to an address.

4. The method of claim 3, wherein the address mapping is stored in the dialing plan repository.

5. The method of claim 3, wherein the address is an internet protocol address.

6. The method of claim 1, wherein the call attempt is initiated from the network endpoint.

7. The method of claim 6, wherein the network endpoint comprises a time division multiplexing phone.

8. The method of claim 1, wherein the reduced number dialing plan enables the call attempt to be completed using less than seven digits of a phone number.

9. The method of claim 1, wherein the dialing plan further comprises an international dialing plan that enables the call attempt to be completed using less than seven digits of a phone number.

10. The method of claim 1, further comprising:
    authenticating the network endpoint prior to allowing the network endpoint to retrieve the address mapping from a dialing plan repository.

11. The method of claim 1, further comprising:
    registering an additional network endpoint, for retrieving the address mapping from a dialing plan repository.

12. The method of claim 1, wherein the responding to the dialing plan request using the address mapping is independent of any service plan associated with the dialing plan.

13. A computer readable medium storing a software program, that, when executed by a computer, causes the computer to perform a method comprising:
    receiving a dialing plan request from a network endpoint;
    retrieving an address mapping in response to the dialing plan request, wherein the address mapping maps the dialing plan request to a dialing plan found in one of a plurality of service plans offered by a service provider, wherein the enterprise customer is a customer of the service provider and subscribed to a service plan of the plurality of service plans, wherein the dialing plan is a reduced number dialing plan that allows an enterprise customer to dial fewer than all digits of a telephone number, wherein the enterprise customer is not a subscriber to the dialing plan; and
    responding to the dialing plan request using the address mapping, wherein the responding to the dialing plan request comprises completing a call attempt using the dialing plan.

14. The computer readable medium of claim 13, wherein the address mapping is retrieved from a dialing plan repository.

15. The computer readable medium of claim 13, wherein the address mapping is formed by mapping a dialing plan to an address.

16. The computer readable medium of claim 13, wherein the call attempt is initiated from the network endpoint.

17. The computer readable medium of claim 13, wherein the reduced number dialing plan enables the call attempt to be completed using less than seven digits of a phone number.

18. An apparatus for providing a network endpoint of an enterprise customer network access to a dialing plan, comprising:
    a processor; and
    a computer-readable medium in communication with the processor, wherein the computer-readable medium has stored thereon a plurality of instructions, the plurality of instructions including instructions which, when executed by the processor, cause the processor to perform a method, comprising:
    receiving a dialing plan request from the network endpoint;
    retrieving an address mapping in response to the dialing plan request, wherein the address mapping maps the dialing plan request to a dialing plan found in one of a plurality of service plans offered by a service provider, wherein the enterprise customer is a customer of the service provider and subscribed to a service plan of the plurality of service plans, wherein the dialing plan is a reduced number dialing plan that allows the enterprise customer to dial fewer than all digits of a telephone number, wherein the enterprise customer is not a subscriber to the dialing plan; and
    responding to the dialing plan request using the address mapping to complete a call attempt using the dialing plan.

19. The method of claim 6, wherein the network endpoint comprises an Internet protocol phone.

20. The method of claim 6, wherein the network endpoint comprises an integrated services digital network phone.

21. The method of claim 6, wherein the network endpoint comprises a computer.

* * * * *

UNITED STATES PATENT AND TRADEMARK OFFICE
CERTIFICATE OF CORRECTION

PATENT NO. : 8,340,261 B2  
APPLICATION NO. : 10/951137  
DATED : December 25, 2012  
INVENTOR(S) : Marian Croak and Hossein Eslambolchi Page 1 of 1

It is certified that error appears in the above-identified patent and that said Letters Patent is hereby corrected as shown below:

In the Claims

Column 7, line 41, in Claim 1, after "plan" insert --for enabling the enterprise customer to access the dialing plan at any time, regardless of the service plan to which that enterprise customer has subscribed--.

Column 8, line 7, in Claim 13, after "A" insert --non-transitory--;

Column 8, line 9, in Claim 13, delete "a method" and insert instead --operations, the operations--;

Column 8, line 21, in Claim 13, after "plan" insert --for enabling the enterprise customer to access the dialing plan at any time, regardless of the service plan to which that enterprise customer has subscribed--;

Column 8, line 46, in Claim 18, delete "a method," and insert instead --operations, the operations--;

Column 8, line 58, in Claim 18, after "plan" insert --for enabling the enterprise customer to access the dialing plan at any time, regardless of the service plan to which that enterprise customer has subscribed--.

Signed and Sealed this  
Fifteenth Day of October, 2013

Teresa Stanek Rea  
*Deputy Director of the United States Patent and Trademark Office*